Apr. 24, 1923.
H. GINGER
HEATING AND LIGHTING RADIATOR
Filed Aug. 21, 1922
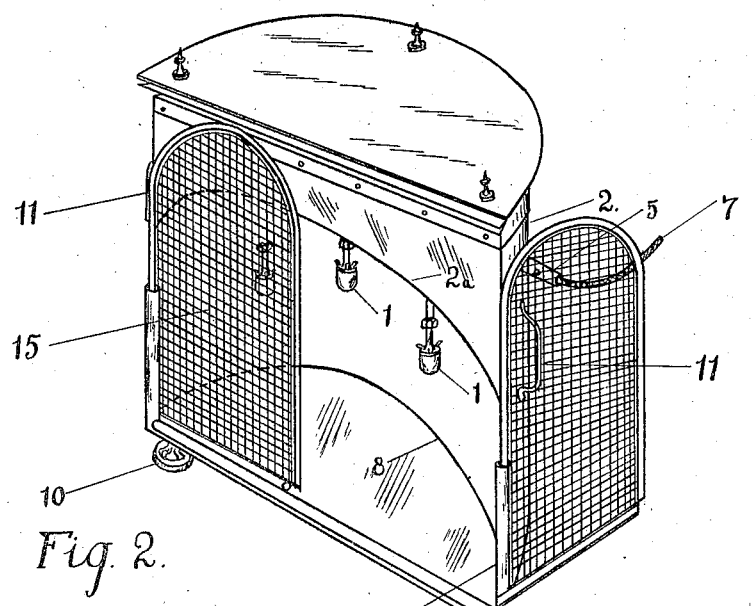
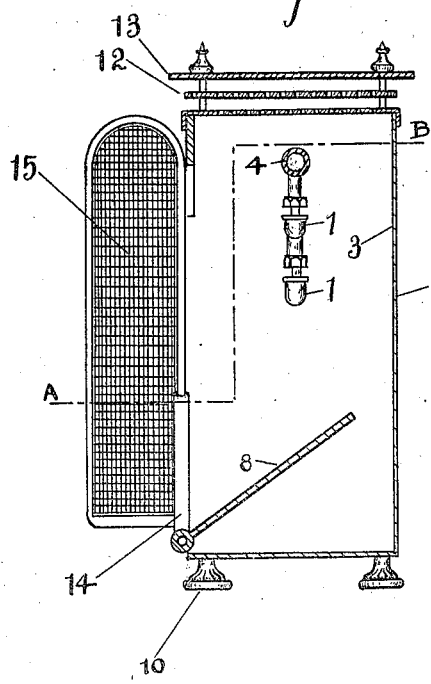
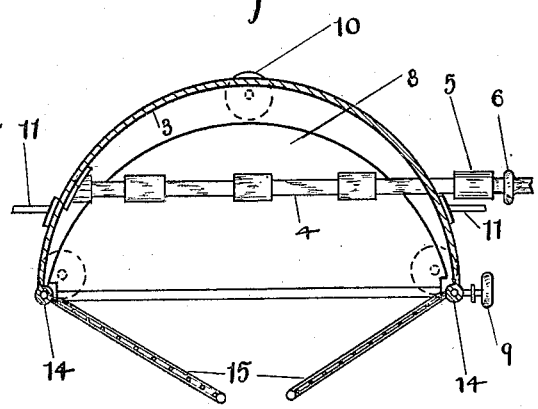
Witnesses
Inventor
Henry Ginger, Patented Apr. 24, 1923.

1,452,800

UNITED STATES PATENT OFFICE.

HENRY GINGER, OF WALTHAM CROSS, ENGLAND.

HEATING AND LIGHTING RADIATOR.

Application filed August 21, 1922. Serial No. 583,404.

*To all whom it may concern:*

Be it known that I, HENRY GINGER, a subject of the King of England, residing at Waltham Cross, Hertfordshire, Kingdom of England, have invented new and useful Improvements in Heating and Lighting Radiators, of which the following is a specification.

This invention relates to combined, portable heating and lighting radiators arranged in a casing and its object is to provide an improved construction and combination of internal reflecting surfaces, or reflectors, whereby improved effects of heat and light are obtained.

Another object is to provide one or more adjustable reflectors by means of which the heat and light can be thrown outwardly in a predetermined direction.

A further object is to provide the said casing with external heat radiating or distributing and reflecting plates disposed in spaced relation to the casing and preferably perforated in part or in toto or otherwise formed so as to facilitate the circulation of air.

The several characteristic features of my invention are fully set forth in the following description and illustrated in the annexed drawing making part of the application.

Figure 1 is a perspective view of an apparatus embodying the invention; Fig. 2 is a vertical transverse section; and Fig. 3 is a horizontal section on the line A—B of Fig. 2.

Referring to the drawing, the artificial heat-source 1 is mounted in an open fronted casing 2, which is preferably made of aluminum or other metal capable of taking a high polish, and has located therein behind the heat-source a vertical reflecting surface 3 which is curved the concave surface facing towards the heat-source 1 and serving to throw the heat and light out of the open front of the casing. In the construction illustrated, this reflecting surface 3 is the interior surface of the rear wall of the casing 2, so that in plan (Figure 3) the casing is more or less semi-circular or D shaped. In the construction shown in the drawing, gas supplies the heat and light, and for this purpose I advantageously arrange a series of ordinary inverted incandescent gas burners 1 to depend from a transverse gas pipe 4 extending across the upper part of the casing 2 substantially parallel with the front of the casing, one end of the pipe 4 extending through the wall of the casing and having an air regulating sleeve 5 and a nipple 6 for attachment to a flexible or other tube 7 supplying gas. The burners may occupy positions in the casing at the same height, or as shown at different heights.

Within the bottom of the casing is arranged an adjustable reflector 8, which when horizontal exactly fits the bottom of the casing. At its front edge it is secured to or mounted upon a transverse rod rotatably mounted in the casing, as by passing through holes in the lower ends of vertical tubes 14 provided at the sides of the casing for a purpose hereinafter described. One or each of the ends of the rod projects beyond the wall of the casing and is provided with a suitable adjusting knob or handle 9. In the construction shown, the rod is intended to fit frictionally tight in its bearings, but if desired one end may be provided with ratchet means co-operating with the casing 2, so that the reflector remains in any position to which it may be adjusted. If ratchet means are provided, the pawl or its equivalent is adapted to be moved by hand into an inoperative position to enable the angle of inclination of the reflector to be altered when desired.

The casing is mounted on ornamental feet 10 and may have one or more handles 11 whereby it may be lifted. The top of the casing is perforated, and fixed at a short distance in spaced relation thereto is a metal plate 12 of substantially the same shape but slightly larger. This plate also has a few perforations therein and fixed at a short distance thereabove is another plate 13 similar in size which is preferably highly polished and may consist, like the casing 2 of the apparatus, of aluminum. These plates 12 and 13 become heated by the heat rising from the burners 1 and serve to heat air which circulates through the spaces between the plates and the top of the casing, thereby increasing the efficiency of the heating action of the apparatus.

The opening in the front of the casing 2 is preferably arched as indicated at 2ª, so as to conceal the transverse gas pipe 4 from which the burners 1 depend, and I may provide an adjustable screen or screens for the upper part of this opening, or as shown for the whole of the front of the appliance, For mounting the screen or screens I may provide at each side of the front of the casing a length of metal tube 14 in which may rotate the legs of a pair of door-like screens 15 which consist of wire mesh carried by a rigid peripheral frame member. Alternately I may employ a single screen consisting of an arched or other shaped metal frame the upper portion of which carries screening means, and the legs of which are slidably adjustable in the tubes 14. This screening means may consist of ornamental glass or other beads, or the like, suspended from the arched frame, or of wire mesh extending between the arch and a transverse bar joining the legs at a suitable height, or an opaque screen may be employed. With the foregoing constructions the screen, or screens 15, may be adjusted, either vertically or angularly respectively, so as to control within limits the direction and/or amount of light and heat radiated from the apparatus.

I claim:

1. A combined portable heating and lighting radiator comprising a casing, a source of heat and light suspended therewithin, an adjustably mounted reflector lodged at the bottom of the casing, and air distributing plates above the casing.

2. A combined portable heating and lighting radiator comprising an open-fronted D-shaped casing, a concave reflecting surface and an adjustable bottom-reflector at the interior of said casing, a perforated top plate for same, superposed air distributing plates carried by the top plate, and suspended heating and lighting burners within said casing.

3. A combined portable heating and lighting radiator comprising an open-fronted D-shaped casing, a concave reflecting surface and an adjustable bottom-reflector internally of the casing, a perforated top plate for same, a superposed perforated plate on the top plate, a spaced reflecting plate carried by said superposed plate, a transverse gas-pipe and inverted incandescent burners carried by said pipe within, and an arched front plate attached to said casing.

4. A combined portable heating and lighting radiator comprising an open-fronted D-shaped casing, a concave reflecting surface and an adjustable bottom-reflector internally of the casing, a perforated top plate for same, a superposed perforated plate on the top plate, a spaced reflecting plate carried by said superposed plate, a transverse gas-pipe and inverted incandescent burners carried by said pipe within, an arched front plate attached to, and adjustable screens at front of said casing.

HENRY GINGER.